United States Patent

Shaffner

[11] Patent Number: 6,005,346
[45] Date of Patent: Dec. 21, 1999

[54] TRICHROMINANCE METAL HALIDE LAMP FOR USE WITH TWISTED NEMATIC SUBTRACTIVE COLOR LIGHT VALVES

[75] Inventor: Richard O. Shaffner, San Jose, Calif.

[73] Assignee: ILC Technology, Inc., Sunnyvale, Calif.

[21] Appl. No.: 08/629,016

[22] Filed: Apr. 8, 1996

[51] Int. Cl.[6] .............................. H01J 17/20; H01J 61/12; H01J 61/18; H01J 61/16

[52] U.S. Cl. ...................... 313/637; 313/638; 313/643; 315/248; 349/74; 349/96

[58] Field of Search ................... 313/637, 638, 313/484, 573–74, 607, 491, 492, 493, 639, 640, 641–43; 359/68; 348/742, 758, 744; 315/248, 39; 349/74

[56] References Cited

U.S. PATENT DOCUMENTS

| | | | |
|---|---|---|---|
| 3,248,590 | 4/1966 | Schmidt | 313/637 |
| 3,840,767 | 10/1974 | Lake | 313/184 |
| 4,492,898 | 1/1985 | Lapatovich et al. | 313/637 |
| 4,757,236 | 7/1988 | Dakin et al. | 313/638 |
| 4,890,042 | 12/1989 | Witting | 313/607 X |
| 4,992,700 | 2/1991 | Lake | 313/638 |
| 5,043,627 | 8/1991 | Fox | 313/491 |
| 5,256,940 | 10/1993 | Wada et al. | 313/640 X |
| 5,363,015 | 11/1994 | Dakin et al. | 313/641 X |
| 5,512,800 | 4/1996 | Omura et al. | 313/637 |
| 5,565,933 | 10/1996 | Reinsch | 348/742 |
| 5,594,563 | 1/1997 | Larson | 349/74 |

Primary Examiner—Nimeshkumar D. Patel
Assistant Examiner—Mack Haynes
Attorney, Agent, or Firm—Thomas E. Schatzel; Law Offices of Thomas E. Schatzel, a Prof. Corp.

[57] ABSTRACT

A primary color lamp comprises a glass envelope with a krypton arc doped with metal halides. A cesium bromide or cesium iodide solution is included with lithium iodide (LiI) to produce red light, thallium iodide (TlI) to produce green light and indium iodide (InI) to produce blue light. The solution controls the vapor pressures of the lithium iodide (LiI), thallium iodide (TlI) and indium iodide (InI) and allows them to be balanced for light amplitude output. No mercury is used in order to eliminate a corresponding yellow light output and the filter complications that result in a system that operates on the primary colors.

6 Claims, 1 Drawing Sheet

TRICHROMINANCE METAL HALIDE LAMP FOR USE WITH TWISTED NEMATIC SUBTRACTIVE COLOR LIGHT VALVES

BACKGROUND OF THE INVENTION

1. Field of the Invention

The invention relates generally to metal halide lamps and more specifically to trichrominance lamps for use with twisted nematic subtractive light valves as are common in display systems such as projection television and computer monitor systems.

2. Description of the Prior Art

Display systems that use broad band light sources and red, green, and blue primary color filters so the individual colors can be modulated, are very inefficient. A better situation is for all the lamp power to be concentrated into three narrow bands at the primary colors. Filtering then wastes very little of the lamp's efficiency.

William H. Lake describes a selective spectral output metal halide lamp in U.S. Pat. No. 3,840,767, issued Oct. 8, 1974. Such lamp uses mercury, as is the norm in the prior art. A high pressure metal halide vapor arc lamp provides light concentrated in selected spectral bands for photochemical and reprographic applications. To produce light in the blue, green, and red bands, the lamp uses zinc iodide ($ZnI_2$) as a buffer species whose radiation is largely suppressed. The emitter species include lithium iodide (LiI), thallium iodide (TlI) and gallium iodide ($GaI_3$), and a small amount of mercury (Hg) that serves as a secondary buffer species.

Twisted nematic subtractive color light valves designed for primary color metal halide lamp illumination conventionally use notch polarizers rather than dichroic dye polarizers to select the red, green and blue peaks. Such primary color metal halide lamps render a substantially broader color gamut than is typical for miniature color displays. The broader color gamut is due to the enhanced spectral power distribution of the prime color lamp, wherein narrower primary color peaks, and a superior contrast and sharper polarization bands pass through the notch polarizers. The primary color lamps were designed to operate at 105 watts or one third the power of the existing xenon lamp. One third the power because the primary color metal halide lamp would produce the trichrominance spectral power distribution without filtering.

The use of mercury in metal halide lamps is ubiquitous. Mercury produces such a high vapor pressure compared to its alternatives, it is irresistible because its use results in high voltage operation, well behaved warm up characteristics and well behaved arc performance. But the mercury itself produces a strong yellow spectra band that requires filtering out in primary color projection systems. Thus, a primary color lamp that is intended to simplify filtering spoils its own principle advantages when it includes mercury. The prior art appears to be devoid of metal halide lamps that avoid the use of mercury.

SUMMARY OF THE PRESENT INVENTION

It is therefore an object of the present invention to provide a primary color lamp that emits a trichrominance spectral power distribution of isolated narrow band red, green and blue color peaks.

It is another object of the present invention to provide an arc lamp that simplifies color filter design by eliminating the yellow light spectra output caused by mercury.

It is a further object of the present invention to provide an arc lamp that has little or no inter-peak luminance so that narrow band notch polarizers could be used to produce a broad color gamut with two to three times higher transmission than is obtained with conventional dichroic dye polarizers.

Briefly, a primary color lamp embodiment of the present invention comprises a glass envelope with a krypton arc doped with metal halides. A cesium bromide or cesium halide solution is included with lithium iodide (LiI) to produce red light, thallium iodide (TlI) to produce green light and indium iodide (InI) to produce blue light. The solution controls the vapor pressures of the lithium iodide (LiI), thallium iodide (TlI) and indium iodide (InI) and allows them to be balanced for light amplitude output. No mercury is used in order to eliminate a corresponding yellow light output and the filter complications that result in a system that operates on the primary colors.

An advantage of the present invention is that an arc lamp is provided that outputs red, green and blue light without yellow light.

Another advantage of the present invention is that an arc lamp is provided that is efficient in color projector applications.

These and other objects and advantages of the present invention will no doubt become obvious to those of ordinary skill in the art after having read the following detailed description of the preferred embodiment which is illustrated in the drawing figure.

IN THE DRAWINGS

FIG. 1 is schematic diagram of a subtractive projection system embodiment of the present invention that uses a primary color metal halide arc lamp.

DETAILED DESCRIPTION OF THE PREFERRED EMBODIMENTS

Figure 1:
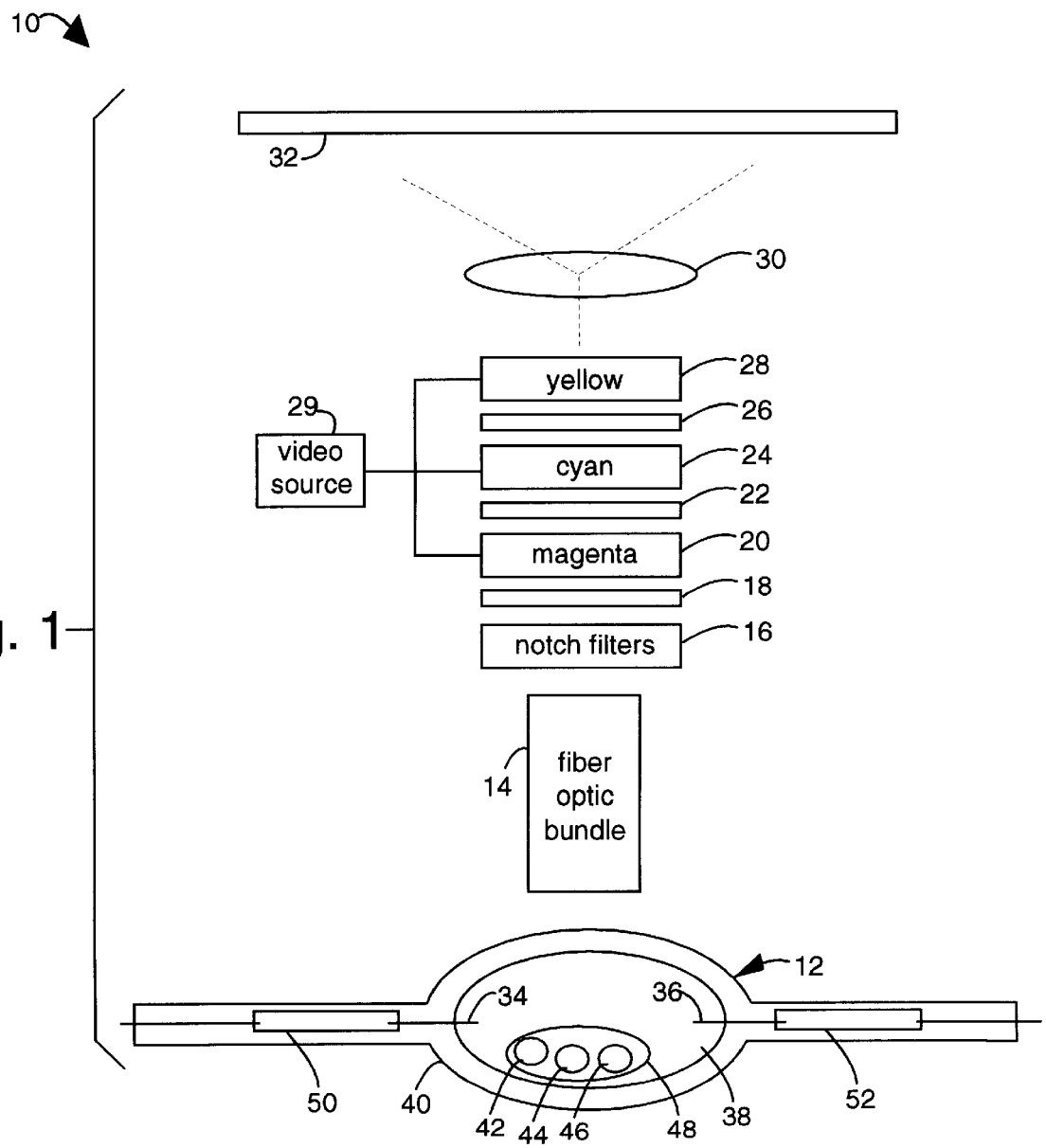

FIG. 1 illustrates video projection system embodiment of the present invention, referred to herein by the general reference numeral 10. The system 10 includes a metal halide krypton arc lamp 12, a fiber optic bundle 14, a notch filter 16, a first polarizer 18, a magenta subtractive color light valve 20, a second polarizer 22, a cyan subtractive color light valve 24, a third polarizer 26, a yellow subtractive color light valve 28, a video source 29 that drives the valves 20, 24 and 28 with magenta-cyan-yellow (MCY) video picture information, a lens 30, and a target screen 32 upon which a composite color picture is displayed. The subtractive color light valves 20, 24 and 28 are twisted nematic liquid crystal types.

The lamp 12 includes a pair of tungsten arc electrodes 34 and 36 with tungsten overwindings to extend life. A krypton (Kr) fill 38 is enclosed by a fused silica, quartz envelope 40. The lamp 12 includes a lithium iodide (LiI) halide dopant 42 to produce red light spectra, a thallium iodide (TlI) halide dopant 44 to produce a green light spectra, and an indium iodide (InI) halide dopant 46 to produce a blue light spectra. Tests indicate that a single band of blue is produced at 450 nanometers, a single band of green is produced at 535 nanometers, and two bands of red are produced at 610 and 670 nanometers. The two red bands mix together well and produce a satisfactory composite. The envelope 40 is typically ten millimeters in diameter. The pair of arc electrodes 34 and 36 are typically separated by 0.125 inches.

The indium iodide (InI) has a vapor pressure that exceeds that of thallium by 2.5 to three times. Thallium iodide (TlI) has a vapor pressure that exceeds that of lithium iodide (LiI)

by five to ten times. A suppressor alkaline solution 48, e.g., cesium bromide or cesium iodide, is used to control the individual vapor pressures of the lithium iodide (LiI) halide dopant 42, the thallium iodide (TlI) halide dopant 44, and the indium iodide (InI) halide dopant 46. Such halide dopants 42, 44 and 46 are preferably balanced by weight to produce red, green and blue light outputs that are roughly equal in amplitude. Other materials that can be used for suppressor solution 48 include rubidium iodide and rubidium bromide. The tungsten arc electrodes 34 and 36 are respectively attached to a pair of thin molybdenum foil seals 50 and 52 that provide hermetic sealing of the envelope 40 for the electrical connections. For example, foils that were 0.080 inches wide by 0.50 inches long have provided good results.

The krypton fill 38 is preferably three to six atmospheres at room temperature. The lamp 12 is filled with this much krypton by temporarily attaching a fill ballast glass fixture through which salts of lithium iodide (LiI), indium iodide (InI), and thallium iodide (TlI) halides and the alkaline suppressor solution are passed before cryofreezing just the lamp 12 and not the ballast by immersion into liquid nitrogen. Such freezing will concentrate enough krypton in the lamp 12 to suit the target pressures. The fill pipe is then pinched off and the ballast is removed.

Due to the lack of mercury, a typical 100 watt lamp operates at twenty volts and draws five amps of squarewave AC, and the warm up characteristics are sacrificed somewhat. But because the mercury and its yellow radiation is eliminated, the filter design of system 10 is greatly simplified.

For such a lamp 12, the weight of halide dopants is typically 0.20 mg of lithium iodide (LiI), 0.10 mg of indium iodide (InI), and 0.10 mg of thallium iodide (TlI).

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An improved trichrominance metal halide metal halide arc lamp and lighting system with a quartz envelope with tungsten electrodes filled with krypton gas, the improvement comprising:
    a lithium iodide (LiI) halide dopant disposed inside said quartz envelope to produce a red light spectra output during operation;
    a thallium iodide (TlI) halide dopant disposed inside said quartz envelope to produce a green light spectra output during operation;
    a an external primary color filter system simplified by excluding all possible mercury within said quartz envelope;
    wherein, the halide dopants are balanced by weight to produce corresponding red, green and blur light outputs that are roughly equal in amplitude;
    an alkaline solution for suppressing the individual vapor pressure of the halide dopants selected from the group of cesium bromide, cesium iodide, rubidium iodide, and rubidium bromide;
    and a cryofrozen krypton fill is initially sealed within an envelope that provides for three to six atmospheres at room temperature.

2. A primary color metal halide arc lamp, comprising:
    a spherical shaped quartz envelope with electrical connections on opposite sides;
    a pair of molybdenum foil seals for hermetic sealing of the envelope and connected to said electrical connections;
    a pair of tungsten electrodes with a gap disposed near the center of the envelope and each connected to corresponding ones of the molybdenum foil seals;
    a cryofrozen krypton fill that is initially sealed within the envelope that provides for three to six atmospheres at room temperature;
    a lithium iodide (LiI) halide dopant to produce a red light spectra;
    a thallium iodide (TlI) halide dopant to produce a green light spectra;
    an indium iodide (InI) halide dopant to produce a blue light spectra; and
    an alkaline solution for suppressing the individual vapor pressures of the halide dopants selected from the group of cesium bromide, cesium iodide, rubidium iodide, and rubidium bromide;
    wherein all mercury is removed to avoid the radiation of yellow light and thus provide for a simplification of an external primary color filter system.

3. The lamp of claim 2, wherein:
    said electrode gap is approximately 0.125 inches;
    the molybdenum foil seals are approximately 0.080 inches by 0.500 inches;
    the lithium iodide (LiI) halide dopant is approximately 0.20 mg by weight;
    the thallium iodide (TlI) halide dopant is approximately 0.10 mg by weight; and
    the indium iodide (InI) halide dopant is approximately 0.10 mg by weight;
    wherein, a 100 watt lamp results that operates at about twenty volts and draws about five amps of squarewave AC.

4. A video projection system, comprising:
    a trichrominance metal halide lamp having no mercury and doped with lithium iodide (LiI), thallium iodide (TlI), and indium iodide (InI) in an alkaline solution selected form the group of cesium bromide, cesium iodide, rubidium iodide, and rubidium bromide, wherein, a cryofrozen krypton fill is initially sealed within an envelope that provides for three to six atmospheres at room temperature;
    optical coupling means proximate to the lamp for conducting light away from the lamp;
    a magenta subtractive color light valve and polarizer positioned to receive said light from the optical coupling means;
    a cyan subtractive color light valve and polarizer positioned to receive said light from the optical coupling means in series with the magenta subtractive color light valve;
    a yellow subtractive color light valve and polarizer positioned to receive said light from the optical coupling means in series with both the magenta and cyan subtractive color light valves;
    a video source connected to each of the magenta, cyan and yellow subtractive color light valves for producing a composite color image form the optical series coupling of the magenta, cyan and yellow subtractive color light valves; and a lens optically coupled to each of the light valves for directing said composite color image to a display screen.

5. The system of claim 4, wherein the lamp further includes:

an electrode gap that is approximately 0.125 inches; and a pair of molybdenum foil seals that are approximately 0.080 inches by 0.500 inches;

wherein, the lithium iodide (LiI) halide dopant is approximately 0.20 mg by weight;

wherein, the thallium iodide (TlI) halide dopant is approximately 0.10 mg by weight;

wherein, the indium iodide (InI) halide dopant is approximately 0.10 mg by weight; and wherein, the lamp operates at about twenty volts and draws about five amps of squarewave AC and has a power consumption of about 100 watts.

6. An improved metal halide arc lamp with a quartz envelope with tungsten electrodes filled with krypton gas, the improvement comprising:

a lithium iodide (LiI) halide dopant to produce a red light spectra;

a thallium iodide (TlI) halide dopant to produce a green light spectra;

an indium iodide (InI) halide dopant to produce a blue light spectra; and a cryofrozen krypton fill is initially sealed within an envelope that provides for three to six atmospheres at room temperature;

wherein, all mercury is removed to avoid the radiation of yellow light and thus provide for a simplification of an external primary color filter system.

* * * * *